(12) United States Patent
Koyama

(10) Patent No.: US 7,341,379 B2
(45) Date of Patent: Mar. 11, 2008

(54) PIVOT ASSEMBLY FOR HARD DISK DRIVE USE

(75) Inventor: Toshisada Koyama, Miyota-Machi (JP)

(73) Assignee: Minebea Co., Ltd., Kitasaku-gu, Nagano-ken (JP)

( * ) Notice: Subject to any disclaimer, the term of this patent is extended or adjusted under 35 U.S.C. 154(b) by 417 days.

(21) Appl. No.: 10/652,409

(22) Filed: Aug. 29, 2003

(65) Prior Publication Data

US 2004/0131292 A1    Jul. 8, 2004

(30) Foreign Application Priority Data

Aug. 29, 2002    (JP) .............................. 2002-250446

(51) Int. Cl.
*F16C 33/76*    (2006.01)
(52) U.S. Cl. ...................... 384/488; 384/477; 384/517
(58) Field of Classification Search ............. 360/99.08, 360/99.07; 384/477, 484, 488, 517; 277/551, 277/550, 572
See application file for complete search history.

(56) References Cited

U.S. PATENT DOCUMENTS

| | | | | |
|---|---|---|---|---|
| 2,253,754 A | * | 8/1941 | Bousman | 384/484 |
| 2,827,344 A | * | 3/1958 | Maag | 384/484 |
| 3,250,580 A | * | 5/1966 | Sikora | 384/477 |
| 4,810,108 A | * | 3/1989 | Yajima | 384/488 |
| 5,529,404 A | * | 6/1996 | Robinson et al. | 384/617 |
| 5,547,291 A | | 8/1996 | Miyazaki et al. | |
| 5,653,541 A | * | 8/1997 | Ishizuka et al. | 384/478 |
| 6,102,575 A | * | 8/2000 | Obara | 384/480 |
| 6,125,007 A | * | 9/2000 | Beck et al. | 360/265.3 |
| 6,371,654 B1 | * | 4/2002 | Misso | 384/499 |
| 6,599,020 B2 | * | 7/2003 | Obara | 384/480 |
| 7,072,148 B2 | * | 7/2006 | Tsuchiya | 360/265.3 |
| 2002/0159663 A1 | * | 10/2002 | Miyazaki | 384/477 |

* cited by examiner

*Primary Examiner*—Richard Ridley
*Assistant Examiner*—Terence Boes
(74) *Attorney, Agent, or Firm*—Townsend and Townsend and Crew LLP

(57) ABSTRACT

To supply a pivot assembly for hard disk drive use that can reliably fix a seal member and solve the problem of out gas, thus reducing the expense and time incidental to the pre-load of a ball bearing. Ball bearings have been joined to both ends of a shaft, and on the outer circumference of these ball bearings, the spacer part is joined to a sleeve disposed between both ball bearings, and a seal member that covers the outer end of the ball bearing has been fixed to the outer circumference of the shaft by laser welding. Because the seal member is fixed by laser welding, the seal member can be reliably fixed and the problem of out gas from the seal member can be solved.

2 Claims, 5 Drawing Sheets

PIVOT ASSEMBLY FOR HARD DISK DRIVE USE

CROSS-REFERENCE TO RELATED APPLICATIONS

This application claims all rights of priority to Japanese Patent Application No. 2002-250446 filed on Aug. 29, 2002, (pending).

BACKGROUND OF THE INVENTION

The present invention relates to a pivot assembly used as the bearing of a swing arm system actuator in a hard disk drive, and more particularly to technology that controls the generation of out gas and, in addition, simplifies the work that applies a pre-load to a ball bearing.

To illustrate an example of the present invention, ball bearings are fixed to both end parts of a shaft having a flange on one end part, such that spacing of both of these ball bearings is held by a spacer or sleeve, where a seal member is fixed on the outside of the other end of the shaft. Here, the seal member is included so that the gas and dirt generated from the grease and the like provided to the ball bearings will not be discharged. Thus, in response to this problem, conventional pivot assemblies used a seal member that was fixed to the shaft by bonding.

However, even with this type of arrangement there was the problem that gas was discharged from the bonding agent that fixed the seal member to the shaft and brought about a harmful effect on the surface of the hard disk and magnetic head. In order to solve this kind of out gas problem, pressing and fixing a seal member onto a shaft was also carried out. However, with fixing by means of pressing in, control of the allowance for pressing in was difficult and there was a lack of reliability of the fixing of the seal member. Furthermore, even after the actions of pressing in, bonding and reliably fixing a seal member to a shaft the problem of out gas from the bonding agent still remained.

Furthermore, in the conventional pivot assembly the ball bearing, shaft and sleeve were fixed by means of a bonding agent. In this case, before all the inner rings and outer rings were completely bonded, a pre-load was applied to the ball bearings. In order to obtain this pre-load, a pivot assembly was attached to a jig, and by means of the spring strength of the jig or the weight of a weight, the inner ring of the ball bearing of one side was pressed to the side of the other ball bearing, and was applied so as to eliminate the axial internal clearance that existed between the inner and outer rings and balls. For this reason, at the inner ring of the ball bearing of the side that had been pressed, that bonding agent was in an unhardened state so as to be able to move in the axial direction. Finally, the pivot assembly was heated in a heating furnace in the state in which a pre-load has been given to a ball bearing by a jig, and the unhardened state bonding agent was completely hardened.

Thus, in the conventional structure, because the pivot assembly must be carried into a heating furnace while being attached to a jig in order to apply the pre-load to a ball bearing, a large quantity of jigs were required, and moreover, jigs had to be made of a material that was heat resistant. For this reason, several disadvantages were observed such as, high manufacturing cost of a pivot assembly due to great expense of the jigs and great amount of work in the attachment and removal of jigs to and from the pivot assemblies. Furthermore, even if a UV hardness adhesive was used as a bonding agent, only the necessity to make the jigs heat resistant was eliminated but the other problems would remain.

SUMMARY OF THE INVENTION

The present invention was conceived to solve the problems of the prior art described above and its object is to provide a pivot assembly which can reduce the expense and time required in the pre-load of a ball bearing, in addition to being able to reliably fix a seal member in order to solve the out gas problem.

In a pivot assembly for hard disk drive use in which ball bearings have been joined to both ends of a shaft, and on the outer circumference of these ball bearings, the spacer part is joined to a sleeve disposed between both ball bearings, and a seal member that covers the outer end of the ball bearing has been fixed to the outer circumference of the shaft by laser welding.

In the pivot assembly for hard disk drive use, because the seal member is fixed by laser welding to the outer circumference of the shaft, the seal member can be reliably fixed, and the problem of out gas can be solved. Furthermore, in the pivot assembly of the present invention the pre-load work can also be simplified.

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

This invention solves the problems of prior art by providing a pivot assembly which can reduce the expense and time required in the pre-load of a ball bearing, in addition to being able to reliably fix a seal member in order to solve the out gas problem.

Figure 1:
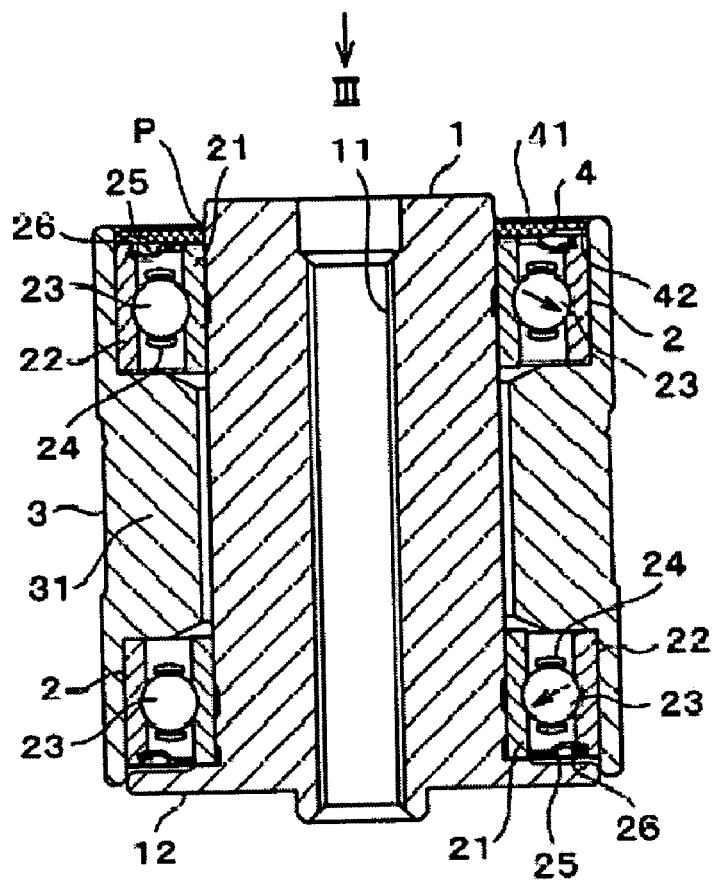
FIG. 1 is a side cross-sectional view showing the pivot assembly of the first embodiment of the present invention.

In accordance with a first embodiment of the present invention, a screw hole 11 is formed in the center of the shaft 1 and the pivot assembly is attached to the hard disk drive by a bolt screwed together at this screw hole 11 as shown in FIG. 1. A flange 12 is formed at the lower edge part of the shaft. On the outer circumference of the shaft 1 a ball bearing 2 caused to contact the end face is joined to the flange 12.

The ball bearing 2 is provided with an inner ring 21 and an outer ring 22 and multiple balls 23 that can roll in a circumferential direction between them. The balls 23 are held at regular intervals in a circumferential direction by a retainer 24. The opening part facing the flange 12 side between the inner ring 21 and the outer ring 22 is blocked by a seal 25. Furthermore, reference numeral 26 in the figure is a snap ring used to fix the seal 25.

Figure 3:
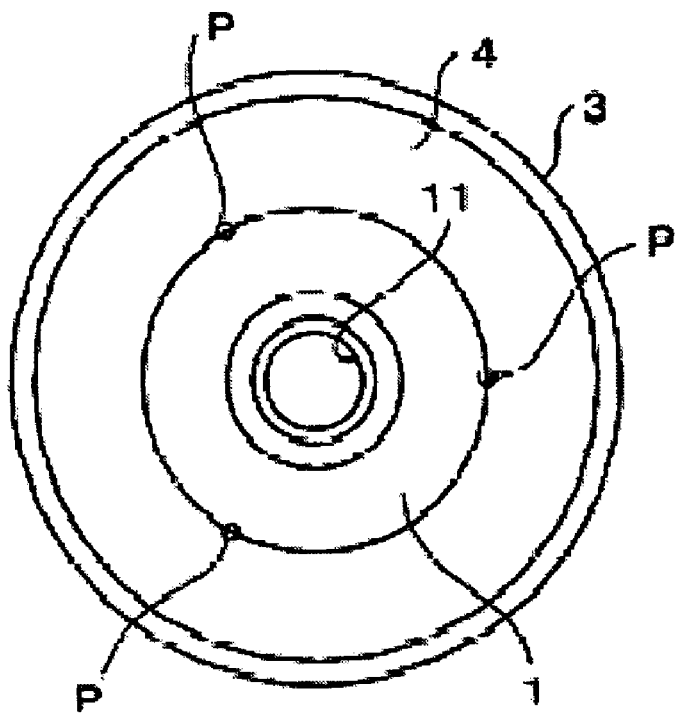
FIG. 3 is the arrow III direction view of FIG. 1.

Also at the top end part of the shaft 1, ball bearings 2 are pressed in. A sleeve 3 has been joined to the outer circumference of these two ball bearings 2 as shown in FIG. 3. In the central part in the axial direction of the sleeve 3, a spacer part 31 with an inner diameter even smaller than both end parts is formed. At both end faces of the spacer part 31 the outer rings 22 of the ball bearings 2 make contact, and by means of the spacer part 31, the outer rings 22 are separated from each other by a set interval. A seal member 4 is fixed to the upper end of the shaft 1. The seal member 4 forms a ring shape and is composed of an inner circumference 41 and an outer circumference 42 that is thinner than the inner circumference 41.

Figure 2:
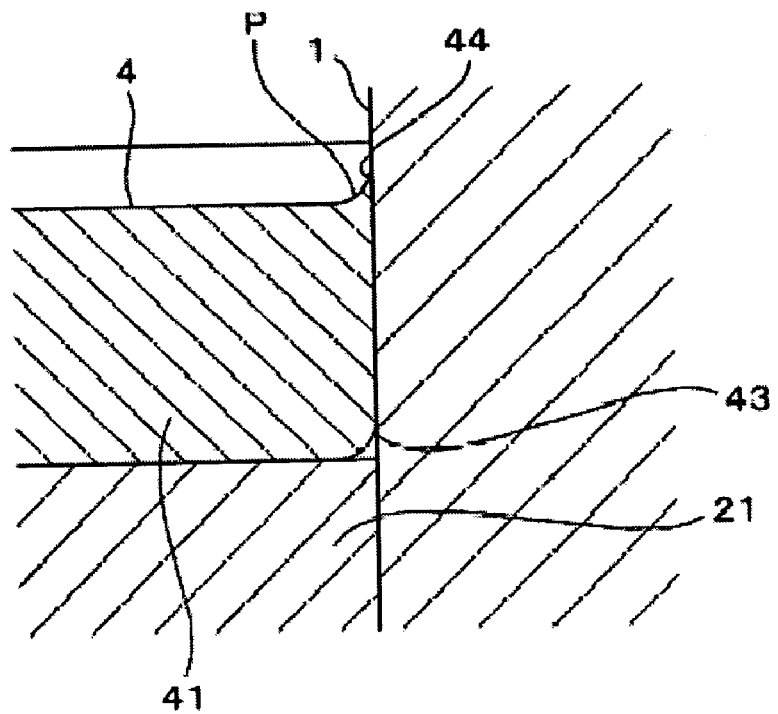
FIG. 2 is an enlarged side cross-sectional view of a welded part.

Since the seal member 4 was formed by press blanking from a metal plate, as shown in FIG. 2, at its inner circumference part 41, a chamfer 43 of the cross-sectional circular arc is formed on the side where the punch penetrated, and a sharp edge part 44 is formed due to thickness die wear or burrs at the side the punch was pushed out. And, the sharp edge part 44 of the seal member 4 is joined to the outer circumference of shaft 1. The inner circumference 41 contacts the inner ring 21 of the ball bearing 2 and in addition, its outer circumference is separated slightly from the inner circumference 41 of the sleeve 3.

Figure 4:
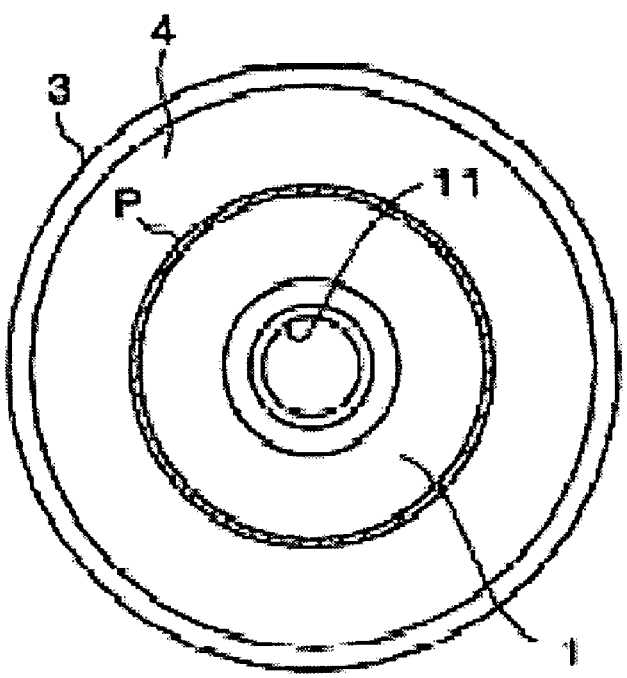
FIG. 4 is a view showing a modified example of FIG. 3.

The seal member 4 is fixed to the outer circumference of shaft 1 by laser welding the sharp edge part 44. In FIG. 3 reference numeral P indicates a nugget created due to welding, and the seal member 4 is spot welded to the shaft 1 at multiple places (3 places in this embodiment) at regular intervals in the circumferential direction. Furthermore, as shown in FIG. 4, laser welding the entire circumference of the sharp edge part 44 of the seal member 4 can also be done.

The base of a swing arm provided with a magnetic head at the tip is attached to the outer circumference of the pivot assembly. The swing arm moves circularly centered on the pivot assembly by means of a drive mechanism such as a voice coil motor, and the magnetic head of the tip moves along the surface of the hard disk.

The pivot assembly is manufactured in the following manner. First, a bonding agent is applied to the outer circumference of the lower end of a shaft 1, and a seal member 4 is joined to it. Meanwhile, a bonding agent is applied to the outer circumference of the upper end of a sleeve 3, and a spacer part 31 is joined to it. When the seal member 4 is joined to the upper end part of a shaft 1, the end surface thereof contacts the inner ring 21 of the ball bearing 2. As such, the seal member 4 is pressed and pre-load is applied.

The bonding agent hardening method differs depending on the bonding agent used, and in the case of a UV bonding agent, ultraviolet rays are irradiated to the application part to cause hardening. An anaerobic adhesive should be left to dry, and epoxy system and other thermo-hardening adhesive should be put into an oven to be heated and hardened. These bonding agents have their respective characteristics and it is necessary to use them properly depending on the place of use. For example, because a UV bonding agent is applicable to the extent that ultraviolet rays can be irradiated, gap bonding is unsuitable. On the other hand, anaerobic adhesive may be reliable when heated and hardened but expensive heating equipment and more work are required.

Generally, in the assembly of a pivot assembly, a UV anaerobic bonding agent is used but more particularly a thermo-hardening bonding agent is selected because of the aspects of reliability (bonding strength) and safety (out gas). The bonding agent that has protruded at the time of joining can be hardened by UV irradiation because the part that bulges out is exposed to the outside where UV irradiation is possible. Consequently, UV anaerobic adhesive that has both UV and anaerobic action is better suitable. Furthermore, recently adhesives that have three actions, that is, UV anaerobic thermo-hardening adhesives have been used. In terms of reliability of the bond and reduction of out gas, a thermo-hardening type adhesive is most suitable.

As shown by the arrow in FIG. 1, when pre-load is applied facing upwards with respect to the inner ring 21, the force thereof is sequentially transmitted to the ball 23, the outer ring 22, the spacer part 31 of the sleeve 3, the outer ring 22 and the inner ring 21. The action is such that the inner ring 21 pushes the outer ring 22 out to the outside via the ball 23. By means of this sequence, the play between the inner ring 21, the ball 23 and the outer ring 22 is eliminated and rotating precision is obtained. The state in which this kind of pre-load has been applied is maintained, and the sharp edge part 44 of the seal member 4 is laser welded. The seal member 4 is fixed to the shaft 1, and the applied pre-load is maintained in the ball bearing 2. In this state, the pivot assembly is put into the heating oven and the bonding agent is completely hardened. When the bonding agent used is a UV bonding agent, it is put into a UV irradiating device hardened by UV irradiation such that the shaft 1, the spacer part 31 and the sleeve 3 are fixed to each other by means of a bonding agent.

Because the seal member 4 is fixed by laser welding to the outer circumference of the shaft 1, the seal member 4 can be reliably fixed, and the out gas problem from the seal member 4 can be solved. If the seal member 4 has been fixed by means of a bonding agent the out gas generated from the bonding agent is liable to directly exert an influence on the disk, but if based on laser welding without using a bonding agent, that kind of problem does not occur. Furthermore, because the seal member 4 is fixed to the shaft 1 and the pre-load is applied, the pivot assembly can be provided to the final hardening treatment without using a jig. Consequently, the jig manufacturing expense and the work in attaching and removing jigs with respect to the pivot assembly becomes unnecessary.

Particularly, in the above-mentioned first embodiment, because the seal member 4 is joined to the shaft 1 so that the surface that faces the press blanking direction becomes the upper side, and is laser welded to the shaft at the sharp edge part 44 formed on the inner circumference 41, a gap and a concave part do not exist between the seal member 4 and the shaft 1, and a laser beam is appropriately irradiated. Furthermore, by welding the sharp edge part 44 an adherence strength equivalent to that of a built-up welding can be obtained.

Figure 5:
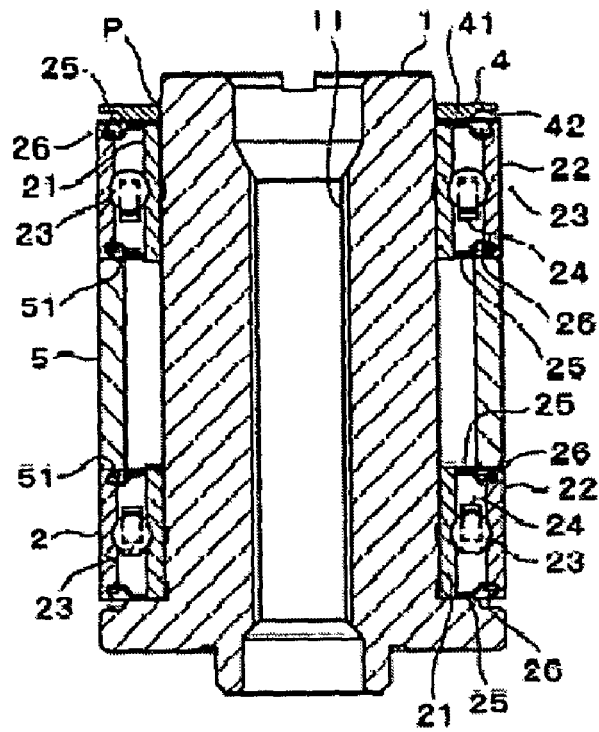
FIG. 5 is a side cross-sectional view showing the pivot assembly of the second embodiment of the present invention.
Figure 6:
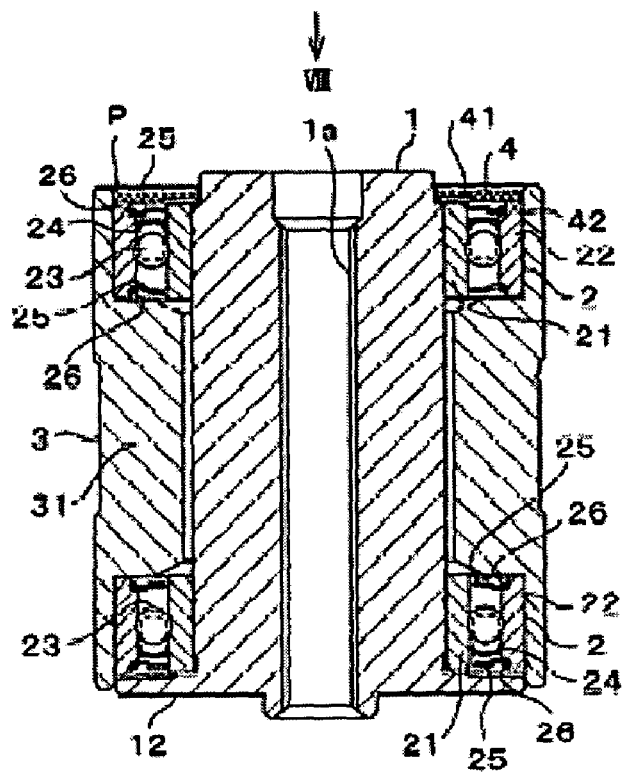
FIG. 6 is a side cross-sectional view showing the pivot assembly of the third embodiment of the present invention.

In accordance with a second embodiment of the present invention as shown in FIG. 5, a spacer 5 is used instead of a sleeve 3.

The spacer 5 is a ring shape that has an outer diameter equal to that of the ball bearing 2 and so, it covers the gap of the outer rings 22 and separates them at regular intervals. At the inner circumference side of the end face of the spacer 5 a convex line 51 that protrudes in the axial direction is formed, and by joining this convex line 51 with the concave part formed on the inner circumference side of the end face of the outer ring 22, both are positioned on concentric circles.

In this second embodiment a seal member 4 consists of an inner circumference 41 which contacts an inner ring 21, and an outer circumference 42 thinner than this inner circumference 41. Furthermore, the seal member 4 is formed by press blanking from a metal plate, and in the inner circumference 41 a chamfer equal to that shown in FIG. 2 and a sharp edge part are formed. The seal member 4, with the sharp edge part facing upwards, is fixed with the shaft 1 by laser welding the sharp edge part. Laser welding consists of the spot welding shown in FIG. 3 or the seam welding shown in FIG. 4.

The pivot assembly of the second embodiment can be manufactured by the same method as that of the first embodiment.

Figure 7:
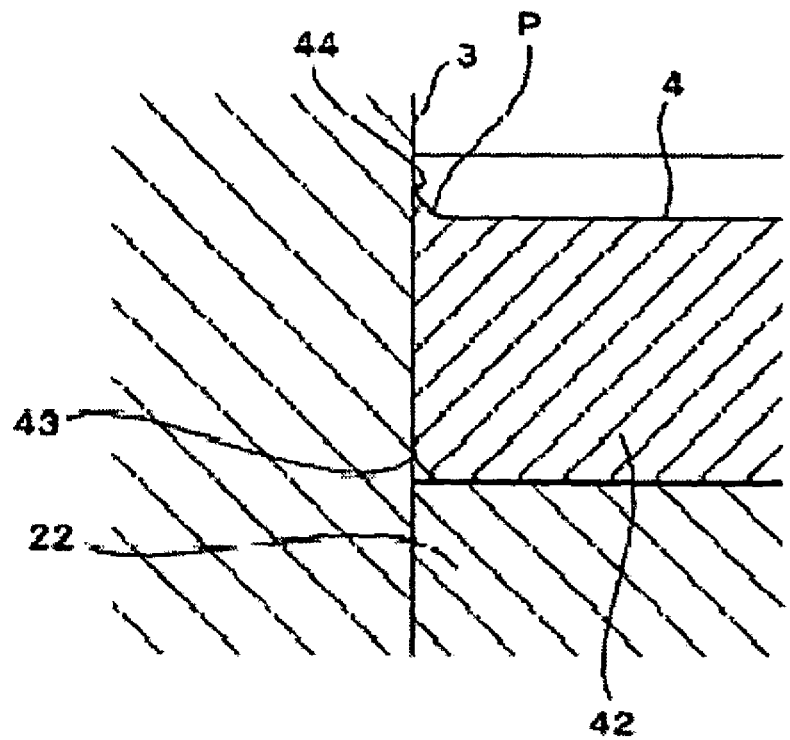
FIG. 7 is an enlarged side cross-sectional view of a welded part.
Figure 8:
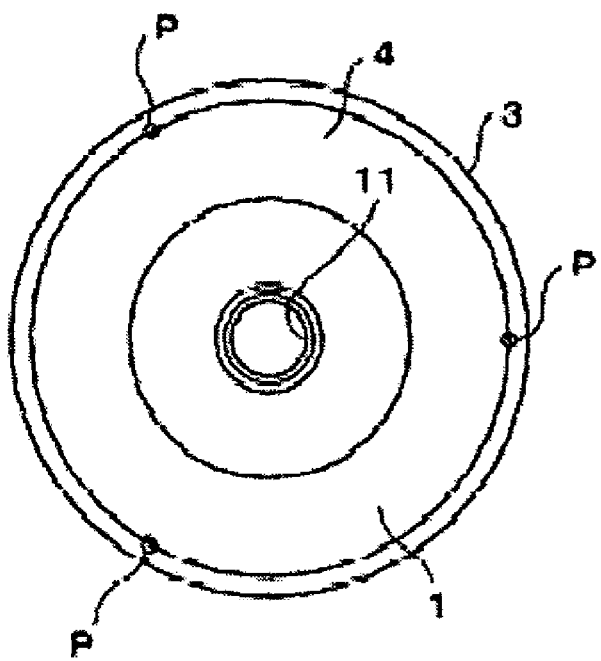
FIG. 8 is the arrow VIII direction view of FIG. 6.
Figure 9:
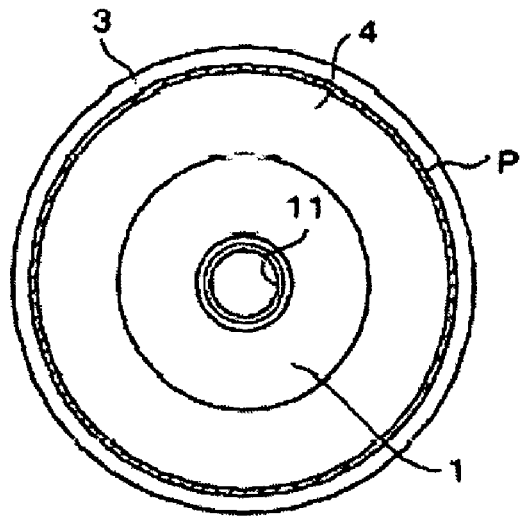
FIG. 9 is a view showing a modified example of FIG. 8.

In accordance with a third embodiment of the present invention as shown in FIGS. 6-9, the seal member 4 is laser welded to the inner circumference 41 of the sleeve 3. The weld nuggets P are shown in FIGS. 8 and 9. Furthermore, in the third embodiment, because the end face of the outer circumference 42 of the seal member 4 contacts the outer wheel 22, the outer circumference 42 is formed thicker than the inner circumference 41.

The seal member 4 is formed by press blanking from a metal plate and a chamfer 43 and a sharp edge part 44 are formed on the outer circumference 42, as shown in FIG. 7. And, the seal member 4 with the sharp edge part 44 facing upwards is fixed to the sleeve 3 by laser welding this sharp edge part 44.

The pivot assembly of the third embodiment can be manufactured by the same method as that of the first embodiment.

Figure 10:
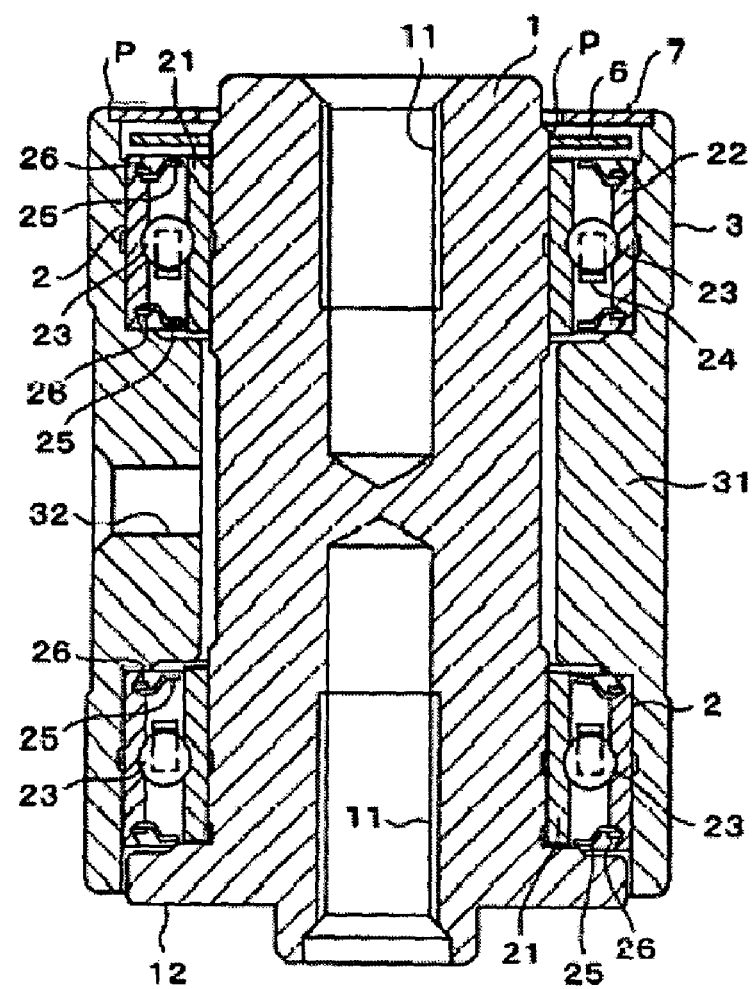
FIG. 10 is a side cross-sectional view showing the pivot assembly of the fourth embodiment of the present invention.

In accordance with a fourth embodiment of the present invention, a first seal member 6 is laser welded to the outer circumference of the upper end of a shaft 1, and further outside from this first hub cap 6 a second seal member 7 is laser welded to the inner circumference of a sleeve 3 as shown in FIG. 10. The first and second seal members 6 and 7 are formed by press blanking from a metal plate and the surface facing the press blanking direction is facing upwards. Consequently, the sharp edge part of the outer circumference of the first seal member 6 is laser welded to a shaft 1, and the sharp edge part of the inner circumference part of the second seal member 7 is laser welded to a sleeve 3.

Furthermore, a screw hole 32 shown in FIG. 10 is used for attaching a swing arm to this pivot assembly. In this fourth embodiment, at the time of laser welding the first seal member 6, a pre-load can be applied to the inner ring 21.

The pivot assembly of the fourth embodiment can be manufactured by the same method as that of the first embodiment. Furthermore, since the first and second seal members 6 and 7 form a labyrinth, there is an added advantage that discharge of gas and dirt and the like from the inner part can be more effectively eliminated.

According to the present invention as explained above, because a seal member is fixed by laser welding to the outer circumference of a shaft or the inner circumference of a sleeve there is no problem of out gassing from the seal member. Furthermore, a pivot assembly can be supplied to the final hardening treatment without using a jig. Consequently, the jig manufacturing expense and the work in attaching and removing jigs with respect to the pivot assembly becomes unnecessary.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. The pivot assembly for hard disk drive comprising:
a first ball bearing having a first inner ring and a first outer ring;
a second ball bearing having a second inner ring and a second outer ring;
a shaft having an outer surface;
a sleeve having a spacer part disposed between the first and second ball bearings; and
a seal member press-fitted to the outer surface of the shaft,
wherein the first outer ring and the second outer ring contact the spacer part of the sleeve, wherein the seal member presses on the first inner ring, and wherein when a preload is applied to the seal member, the preload is sequentially distributed from the seal member to the first inner ring, the first outer ring, the spacer part and the second outer ring,
wherein said seal member further comprises a chamfered edge part in one side and a pointed edge part at the other side; and
wherein said pointed edge part is fixed to said outer circumference of said shaft by laser welding after the preload is applied.

2. The pivot assembly for hard disk drive comprising:
a first ball bearing having a first inner ring and a first outer ring;
a second ball bearing having a second inner ring and a second outer ring;
a shaft having an outer surface;
a sleeve having a spacer part disposed between the first and second ball bearings; and
a seal member press-fitted to the outer surface of the shaft,
wherein the first outer ring and the second outer ring contact the spacer part of the sleeve, wherein the seal member presses on the first inner ring, and wherein when a preload is applied to the seal member, the preload is sequentially distributed from the seal member to the first inner ring, the first outer ring, the spacer part and the second outer ring,
wherein said seal member further comprises a surface part formed by press blanking, said surface part having a pointed edge on one side and a chamfered edge on the other; and
wherein said edge of said surface part is fixed to said outer circumference of said shaft by laser welding after the preload is applied.

* * * * *